Nov. 17, 1959 H. I. OSHRY ET AL 2,912,746

METHOD OF MAKING PRINTED CIRCUIT PANELS

Filed Oct. 10, 1955

Howard I. Oshry
Oliver I. Steigerwalt
Jerome D. Heibel
INVENTORS

BY Ralph Hammar
Attorney

United States Patent Office 2,912,746

Patented Nov. 17, 1959

2,912,746

METHOD OF MAKING PRINTED CIRCUIT PANELS

Howard I. Oshry, Oliver I. Steigerwalt, and Jerome D. Heibel, Erie, Pa., assignors to Erie Resistor Corporation, Erie, Pa., a corporation of Pennsylvania Application October 10, 1955, Serial No. 539,420

1 Claim. (Cl. 29—155.5)

Printed circuit wiring panels require holes for a variety of purposes such as for fasteners, tube sockets, leads, terminals, etc. This invention is intended to simplify the hole forming operations by molding indentations part way through one face of the panel and cutting away the opposite face to a depth intersecting the indentations, thereby forming the holes. This is particularly useful in devices disclosed in Patent 2,716,268.

Figure 1:
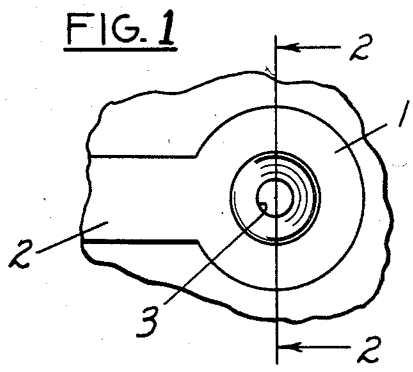
Figure 2:
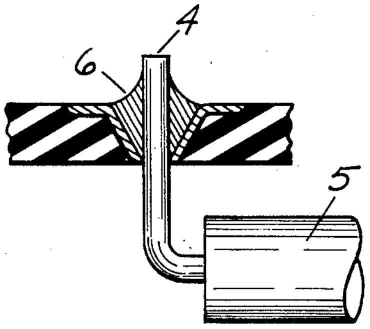
Figure 3:
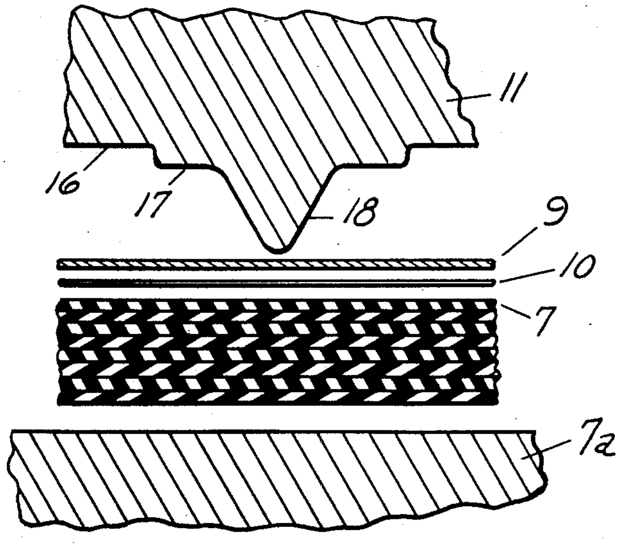
Figure 4:
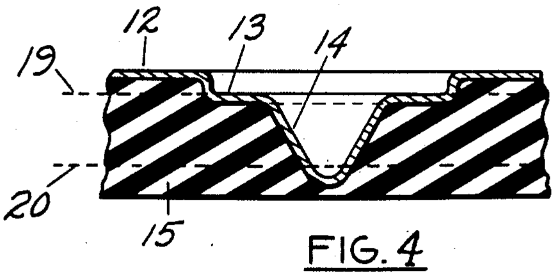

The accompanying drawing of Fig. 1 is a top plan view of a small portion of a printed circuit wiring panel; Fig. 2 is a section on line 2—2 on Fig. 1; Fig. 3 is an exploded view illustrating the process of manufacture and Fig. 4 is a fragmentary section through the printed circuit wiring panel at the end of the molding operation and prior to the surface abrading operation.

In Fig. 1 is shown a view of a small part of a printed circuit wiring panel made in accordance with Patent 2,716,268. The complete panel will include a great many terminal areas 1 and circuit wiring inter-connections 2 arranged to meet the particular circuit requirements. At the center of the terminal area 1 is a hole 3 for receiving a lead 4 of an electric circuit component 5 such as a resistor or condenser. The electrical connection between the lead 4 and the terminal area 1 is effected by solder 6. In addition other holes are required in the panel for example to receive tube sockets or for receiving fasteners for mounting the panel or for mounting devices on the panel. These holes obviously will be of different size and shape than the hole 3. Heretofore the most economical way of forming these holes has been by punching dies operating on the finished panels. These punching dies are expensive and while the holes punched were always in fixed relation to each other, variable shrinkage in the plastic resin material of which the circuit panels are most usually made results in misregistration of the punching dies with the individual elements of the panels.

In order to eliminate these problems, indentations are molded part way through from one face of the panel and the reverse face is ground or cut away to a depth intersecting the indentations and thereby forming holes. This is well adapted to the method of Patent 2,716,268 where a plurality of sheets 7 of fiber impregnated with uncured plastic are arranged on a heated lower platen *7a*. On top of the sheets 7 is arranged a sheet 9 of metal foil with an underlying film 10 of adhesive which may be a separate film or a coating on the foil or a part of the plastic impregnated sheets 7. The sheets 7 are deformable under molding pressure so that when the upper heated platen 11 closes under molding pressure, the sheets 7 and foil 9 are consolidated to the finished shape shown in Fig. 4. When the part leaves the molding press, the foil 9 is adhesively united to the underlying plastic base which has been molded to the shape determined by the upper heated platen 11. In the molded piece shown in Fig. 4, there are sections 12 which are not wanted in the finished printed circuit panel, sections 13 which are to remain in the finished panel and indentations 14 which extend nearly through the panel but terminate short of the opposite surface 15. The portions 12 which are not wanted in the finished panel are located at the level of surfaces 16 on the upper platen 11. The surfaces 13 which are to remain in the finished panel are located at the level of surfaces 17 on the upper platen and the indentations 14 correspond to projection 18 on the upper platen. It will be appreciated that the shape of the surfaces 16, 17 and 18 on the upper heated platen 11 will vary widely with different panels. At the end of the molding operation, the entire upper surface of the molded panel is covered with metal foil 9 which is both embossed to the configuration of the upper platen 11 and adhesively united to the panel. Although the metal foil is shown unbroken in the indentations 14, it is not necessary that the foil be drawn or stretched to completely line the indentations 14. If the indentations 14 are to be used for making soldered connections, it will be advantageous to have the foil line a large part of the indentations. If the indentations are to be used for receiving a fastening device or a separately manufactured part such as a tube socket, there will be no need for any foil lining the indentations. Whether the projections 18 on the heated upper platen cause the foil to be drawn or stretched or whether the projections 18 rupture the foil will be determined by the design of the projections.

The manufacture of the printed circuit panel is completed by grinding away the top surface of the molded panel to the depth of dotted line 19 and by grinding away the bottom surface of the panel to the depth of dotted line 20. The grinding to the depth of dotted line 19 removes the portions 12 which are not wanted in the completed panel. Grinding to the depth of dotted line 20 intersects the lower ends of the indentations 14 and forms the holes through the panel. Both the grinding or cutting operations removing the material to the depth of the lines 19 and 20 in no way affect the configuration of the conducting elements on the circuit panel such as indicated at 1 and 2. These grinding or cutting operations require no special tools. With this method of forming the holes, there is no possibility of misregistration of the holes with respect to the portions 13 which are to remain in the finished printed circuit panel. The registration of the holes is determined by the molding die 11 and variations in shrinkage in the molded plastic and in no way affect the registration. Accordingly, the holes formed in this manner are more accurately located than those which can be formed by punching dies.

The embossing of the foil and indentations can be carried out in a standard laminating press such as used in the manufacture of plain foil clad laminates. These presses make large sheets which can be cut up to make many printed circuit panels.

What is claimed as new is:

The method of making printed electric circuit panels which comprises arranging a metal foil on one surface of an uncured deformable base sheet of fibers of insulating material and an impregnating plastic and including adhesive material under the foil, positioning a die on the foil having an embossing projection thereon consisting of circuit forming projections forming indentations corresponding to the circuit pattern to be printed and further consisting of hole forming projections in register with the circuit forming projections at locations where holes through the panel are to be formed, said hole forming projections outstanding a substantial distance from the circuit forming projections, pressing the die, foil and base together in a press having platens heated to the flowing temperature of the impregnating plastic under pressure sufficient to emboss the foil under the circuit and hole forming projections into the underlying surface of the base and maintaining the pressure until the plastic is cured and the foil is united and consolidated with the base, the top surface of the bottom of the indentations formed by the hole forming projections being below the underside of the foil of the circuit pattern but terminating short of the opposite surface of the base sheet, cutting away the foil coated surface of the base to a depth below that of the unembossed portions of the foil to leave only the embossed portions of the foil united with the base, and cutting away the opposite surface of the base sheet to a depth intersecting the indentations formed by the hole forming projections above the top surface of the bottom of the indentations to form holes through the base sheet.

References Cited in the file of this patent

UNITED STATES PATENTS

| | | |
|---|---|---|
| 1,767,715 | Stoekle | June 24, 1930 |
| 2,182,067 | Bruecker | Dec. 5, 1939 |
| 2,502,291 | Taylor | Mar. 28, 1950 |
| 2,716,268 | Steigerwalt | Aug. 30, 1955 |